A. McCREIGHT.
Wheel Cultivator.
No. 81,660. Patented Sept. 1, 1868.
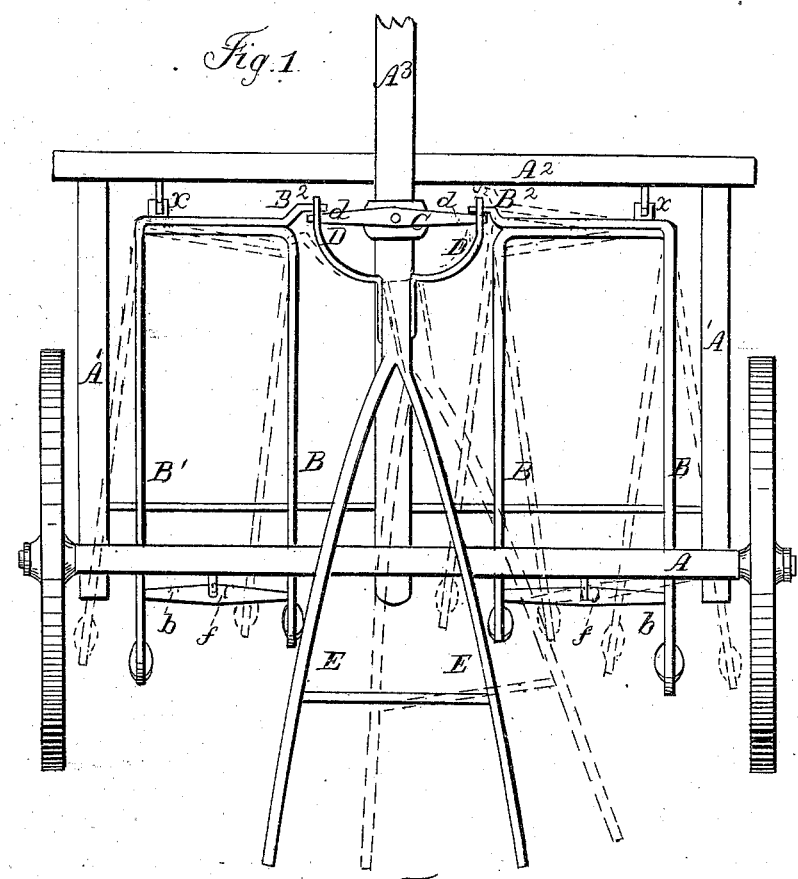
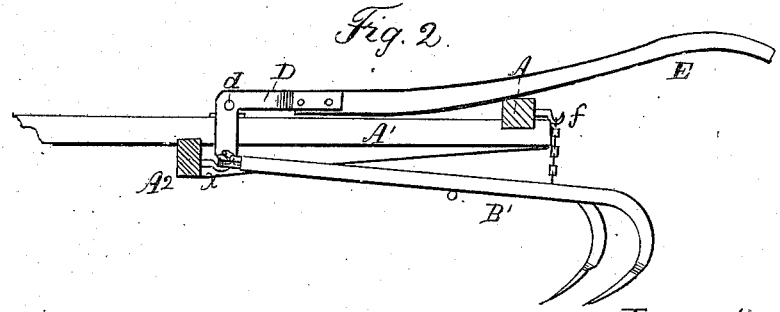

UNITED STATES PATENT OFFICE.

ALEXANDER McCREIGHT, OF TRANQUILITY, OHIO.

IMPROVEMENT IN CORN-PLOWS.

Specification forming part of Letters Patent No. 81,660, dated September 1, 1868.

*To all whom it may concern:*

Be it known that I, ALEXANDER MC-CREIGHT, of Tranquility, in the county of Adams and State of Ohio, have invented new and useful Improvements in Plows; and I do hereby declare that the following is a full and exact description of the same, reference being had to the accompanying drawings, and to the letters of reference marked thereon.

This invention relates to certain improvements in corn-plows; and it consists, principally, in a novel arrangement of devices whereby the shovels or plows proper are readily swung out of the line of the movement of the team at the will of the plowman, the arrangement being such that they may be moved to or from each other or be swung to either side simultaneously, or one side be moved and the other held stationary, as may be desired, according to the varying circumstances of the case.

The details of the arrangement will be fully described hereinafter.

Figure 1 represents a plan view, and Fig. 2 a side elevation, of my improved plows.

In the drawings, A represents the axle, to which is attached the frame A' A² and pole A³.

B B' represent the drag-bars, to the rear ends of which are attached the shovels. It will be observed that these drag-bars are arranged in pairs, one pair being located on each side of the pole. The construction and arrangement of both pairs are the same. The bars B B' of each are connected in front by bending their ends at right angles toward each other and riveting them together, as clearly shown in Fig. 1. Their rear ends are connected by the bar *b*. Each pair of bars is suitably attached at *x* to the beam A² in such manner as to swing freely from side to side and permit elevation when necessary, the point of attachment, however, not being in line with the center of the bars, but at a point upon the outside of the line of the center.

B² represents elbows formed from a continuation of the outer drag-bar, B', of each pair.

C represents a cross-bar or single-tree, pivoted at its center upon the pole A³, as shown.

D D represent elbow-levers, the short arms of which are attached to the elbows B², the latter passing into suitable sockets in the former. The levers D have their fulcrum at *d* upon the ends of the cross-bar C, being so arranged as to turn freely thereon, from which point they curve toward each other, and are rigidly attached to the front ends of the handles E.

*f f* represent rearwardly-projecting hooks upon the axle A, by means of which the shovels are held up when passing from field to field, the connecting-bar *b* being provided with chains for that purpose.

The operation of my improved plow is as follows: When moving regularly along, the shovels follow in line with the movement of the team, the drag-bars being held by the elbows B² (which rest in the ends of levers D) and by the attachment at *x*. It will now be observed that the latter attachment is stationary, while the former is movable. Now, if the handles E be elevated, the levers D turn on the fulcrum *d* and move the elbows B² in a backward direction, and as the attachment at *x* is stationary, the result is that the rear ends of the drag-bars are swung apart from each other. If the handles be depressed, the operation is of course reversed. If the handles E be moved to either side, a new movement takes place. The cross-bar C turns upon its pivot, and through the medium of the levers D one of the elbows B² of the drag-bars is thrown forward and the other backward. The result is that the drag-bars are both swung simultaneously to one side or the other. If the handles are moved to one side, at the same time being raised, thus forming an angle of about forty-five degrees, still another movement takes place. It will be observed that upon one side the movement upward offsets the movement to one side, so that the drag-bars are stationary, while on the other side the drag-bars are swung rapidly to one side. Therefore, if the handles be moved to the left with the upward motion the right pair of shovels will be swung aside, while the left are stationary. If the operation is reversed, the result will be reversed.

From the construction and arrangement herein described an extremely simple and efficient corn-plow is produced which is entirely under the control of the operator. The different movements permitted by the arrangement are sufficient for all the varying circumstances of the case.

Having thus fully described my invention, what I claim as new, and desire to secure by Letters Patent, is—

1. The drag-bars B B', arranged as described, when operated by means of a fixed and movable attachment, substantially in the manner set forth.

2. Operating drag-bars by means of levers having movable fulcrum, substantially as described.

3. The drag-bars B B', as described, as in combination with levers D and cross-bar C, substantially as and for the purpose set forth.

This specification signed and witnessed this 18th day of June, 1868.

ALEXANDER McCREIGHT.

Witnesses:
SAMUEL H. DODDS,
WM. McINTIRE.